Feb. 3, 1925.
W. T. SMITH
HORSE COLLAR FASTENER
Filed Jan. 27, 1923
1,525,416
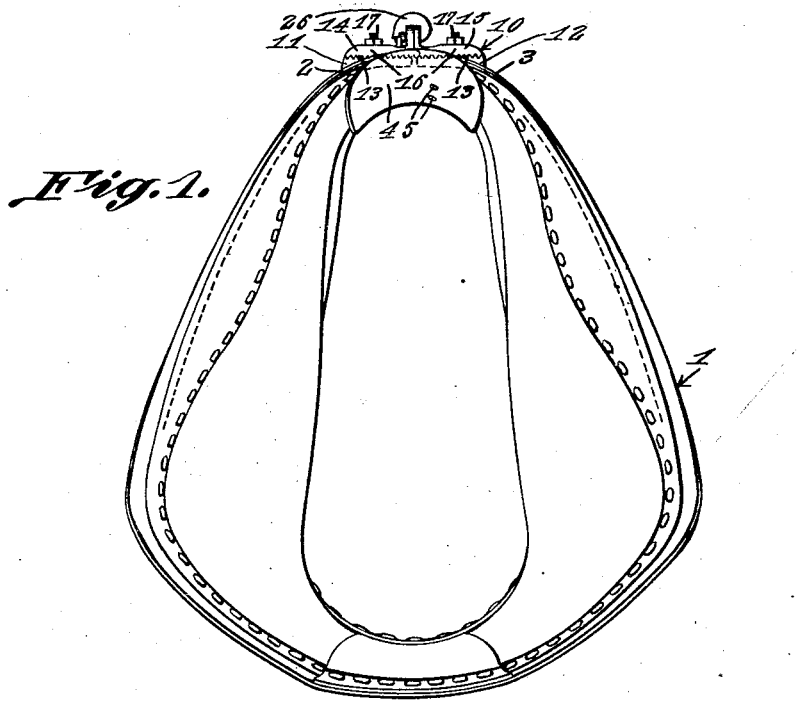
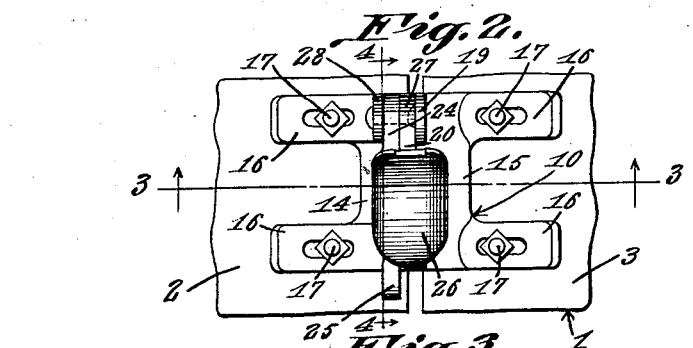
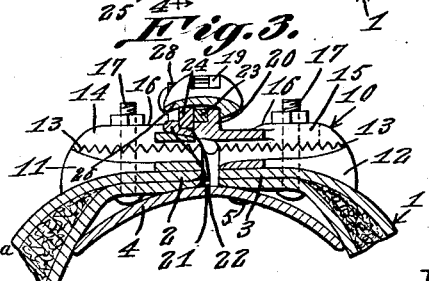
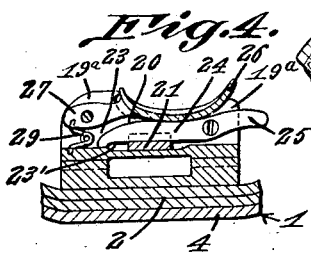
Inventor
W. T. Smith,
By C. A. Snow & Co.
Attorneys Patented Feb. 3, 1925.

1,525,416

UNITED STATES PATENT OFFICE.

WESLEY T. SMITH, OF JACKSONVILLE, ILLINOIS.

HORSE-COLLAR FASTENER.

Application filed January 27, 1923. Serial No. 615,395.

*To all whom it may concern:*

Be it known that I, WESLEY T. SMITH, a citizen of the United States, residing at Jacksonville, in the county of Morgan and State of Illinois, have invented a new and useful Horse-Collar Fastener, of which the following is a specification.

This invention relates to horse collars, and more particularly to fasteners therefor. The object of the invention is to provide a fastener of this character so constructed as to fit horses having different sized necks without changing the face of the fastener.

Another object is to provide a fastener of this character which may be easily applied and adjusted, and which will automatically lock on the meeting of the ends of the collar and reliably hold said ends in closed position until manually released, the release being readily accomplished by pressing a lever.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a rear elevation of a collar equipped with this improved fastener, the latter being shown in side elevation.

Fig. 2 is a plan view of the fastener shown applied and in closed position.

Fig. 3 is a longitudinal section taken on the line 3—3 of Fig. 2, and

Fig. 4 is a transverse section taken on the line 4—4 of Fig. 2.

In the embodiment illustrated, a horse collar 1 of usual construction is shown having the upper ends 2 and 3 thereof separably connected by the fastener 10 which constitutes this invention. The joint or point of connection between the ends is equipped with a curved leather protector 4 to prevent the fastener from rubbing the animal's neck. This protector 4 is riveted at one end to the end member 3 of the collar as is shown clearly in Fig. 1, while the free end thereof underlaps the end 2 when the collar is in closed position.

The fastener 10 constituting this invention comprises two base plates 11 and 12 which are substantially U-shaped in form, the legs thereof being curved on their lower faces to conform to the curvature of the collar ends and are thickened to position the upper faces of the plates flush with each other and to make them rectilinear when applied. The upper faces of these plates 11 and 12 are preferably corrugated or serrated as shown at 13 to cooperate with similar serrations on the lower faces of the members 14 and 15 which are superposed on the base plates and constitute a part of the fastener. The members 14 and 15 conform substantially in shape to the base plates and the legs 16 thereof are longitudinally slotted to receive the fastening bolts 17 which are passed through the collar ends 2 and 3, the legs of the base plates 11 and 12 and through the slots in the legs of members 14 and 15 to provide for the adjustable mounting of the members 14 and 15 on the base plates whereby the size of the collar may be varied to fit different sized horses' necks. The superposed plate or member 15 is equipped with upstanding transversely spaced lugs as 19 which form abutments to cooperate with similar abutments 19ª carried by the member 14.

An upstanding flange 20 connects the lugs 19 and from the front face thereof projects a laterally extending tongue 21 which is equipped with a transversely arranged groove 22 for a purpose presently to be described.

The member 14 has its lugs 19ª also connected by an upstanding flange 23 provided with a recess 23' for the passage therethrough of the tongue 21, the grooved portion of which projects beyond the inner face of the flange and is designed to receive in the groove 22 a locking lever 24. This lever 24 is fulcrumed intermediate its ends on the inner face of the legs 19ª and extends across the opening 23' so that when the tongue 21 passes through said opening, this lever will lie in the groove 22 thereof and lock the two members of the fastener in connected relation. The lever 24 has a finger grip 25 which projects beyond the edge of the lug 19ª on which the lever is fulcrumed in convenient position to be actuated for releasing the fastener in a manner presently to be described.

A spring lock for the lever 24 is shown in the form of a saddle-shaped plate 26 which overlies the upper edge of lever 24 and also the upper edges of the flanges of the two members 14 and 15 when the fastener is in closed position. An arm 27 extends longitudinally from one end of the plate 26 adjacent the inner side thereof, and is pivotally mounted between one of the lugs 19ª of the member 14 and another lug 28 which is spaced from the lug 19ª a distance sufficient to receive said arm. A spring 29 shown clearly in Fig. 4 is arranged under the outer end of the arm 27 and operates to yieldably force the plate 26 into locking engagement with the lever 24 whereby said lever is held in operative engagement with the tongue 21, preventing all possibility of said lever being accidentally disengaged from the tongue. When it is desired to release the fastener, all that is necessary is to depress the finger grip or projecting end 25 of said lever which will cause its opposite end to raise and lift the plate 26 against the tension of its spring, thereby permitting the tongue 21 to be withdrawn. This release of the fastener permits the ends 2 and 3 of the collar to be separated for its application or removal.

When it is desired to adjust the fastener to adapt the collar to fit different sized horses, the members 14 and 15 may be moved backward or forward according to whether it is desired to enlarge or lessen the size of the collar, and after they have been adjusted they are secured by the nuts on the bolts 17 as is shown clearly in Fig. 2.

From the above description it will be obvious that the arrangement of the base plates 11 and 12 with their outer faces made rectilinear and flush with each other provides for the adjustment of the cooperating fastening members 14 and 15 toward or away from each other without in any way altering the face of the fastener so that it may be located or released in the usual way no matter in what position these plates may be located.

It is of course understood that these fasteners may be made as articles of manufacture and applied to the collars already in use which is easily accomplished by passing the bolts through the ends of the collar in the manner above described and then mounting the fastener thereon.

I claim:—

A fastener of the class described comprising substantially U-shaped base plates for mounting on members to be connected, said plates having rectilinear outer faces arranged in transverse alinement with each other when applied, similarly shaped members superposed on said base plates and adjustable in relation thereto, one of said members having a laterally extending transversely grooved tongue and the other an opening to receive said tongue, a lever fulcrumed to enter the groove in the tongue, and a spring locking member for said lever comprising a saddle-shaped plate to overlie the upper edge of said lever and having a longitudinally extending pivoted arm with a spring located under it to yieldably force said plate into locking engagement with the lever.

In testimony that I claim the foregoing as my own, I have hereto affixed my signature in the presence of two witnesses.

WESLEY T. SMITH.

Witnesses:
F. H. BROCKHOUSE,
C. P. SIEGFRIED.